July 15, 1969      E. V. KINGSLEY      3,455,621

DEPOSITORY FOR ARTICLES

Filed Dec. 18, 1967      2 Sheets-Sheet 1

INVENTOR
ELEANOR V. KINGSLEY
BY
Bonard L. Brown
ATTORNEY

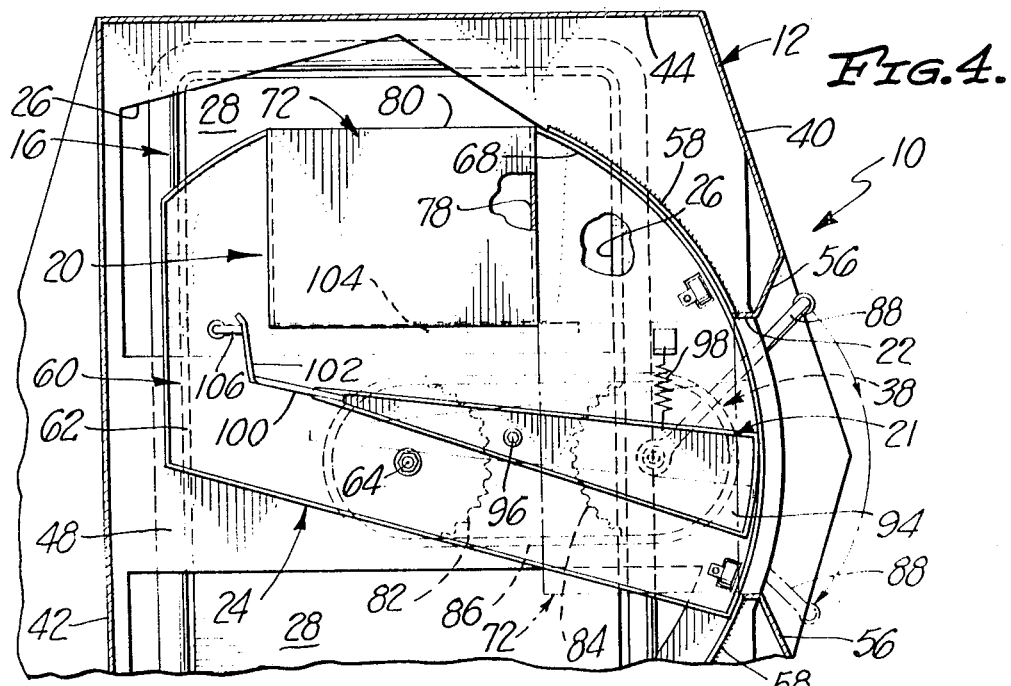
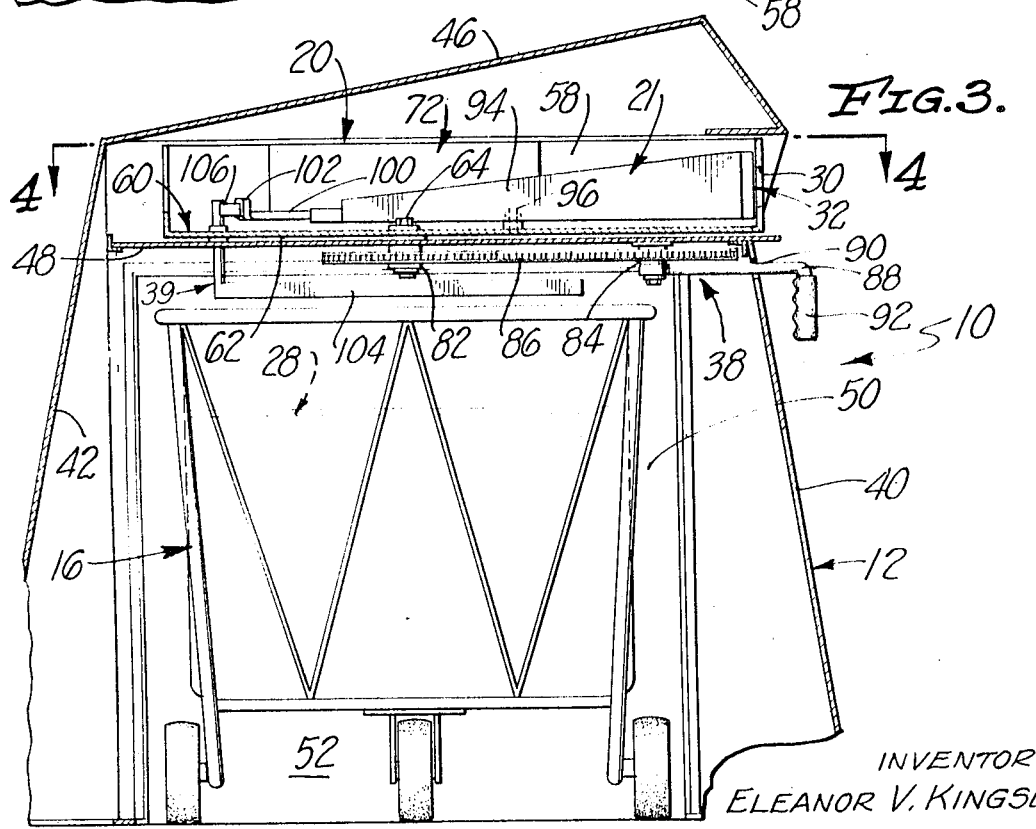

//united States Patent Office 3,455,621
Patented July 15, 1969

3,455,621
DEPOSITORY FOR ARTICLES
Eleanor V. Kingsley, 490 Preciado St.,
Pomona, Calif. 91767
Filed Dec. 18, 1967, Ser. No. 691,586
Int. Cl. B65d 91/00; A47b 81/00; A47g 29/14
U.S. Cl. 312—211                    14 Claims

ABSTRACT OF THE DISCLOSURE

A depository for articles such as books having a cabinet with an article in-feed means for receiving articles from the depository users and depositing the articles in a wheeled cart or other article receiver which is housed within and is removable, by authorized persons only, from the cabinet for transportation of the collected articles to an appropriate handling facility.

This invention relates generally to article handling equipment. More particularly, the invention relates to an article depository for receiving articles, such as library books, from individual depository users and retaining the articles in a safe and secure unattended condition for periodic collection by authorized persons.

As will appear from the ensuing description, the depository of the invention may be utilized for a variety of purposes and as a unattended collection facility for various types of articles. However, the depository is intended primarily to function as an unattended library book collection or return facility to permit the return of library books at convenient locations, such as at curbside, or after normal library hours.

One unique and highly beneficial feature of the depository resides in the fact that the books or other articles placed in the depository are collected in an article receiver, such as a wheeled cart, which may be readily removed from the depository by authorized persons only for transportation of the collected articles without further handling at the depository to an appropriate handling facility. Other features of the depository are concerned with novel article in-feed means operated by the depository user for receiving articles from the users and depositing the articles in the article receiver and with novel signaling means for indicating when the depository is filled to capacity.

A general object of the invention, then, is to provide an article depository for receiving articles from the depository users and retaining the collected articles in a safe and secure unattended condition for periodic collection by authorized persons.

Another object of the invention is to provide an article depository of the character described wherein the collected articles accumulate in an article receiver which may be readily removed from the depository but authorized persons for transportation of the articles without further handling at the depository to an appropriate handling facility.

A further object of the invention is to provide an article depository of the character described having unique article in-feed means for receiving articles from the depository users and depositing such articles in the article receiver, and unique signaling means for indicating when the depository is filled to capacity.

Other objects, advantages, and features of the invention will become readily evident as the description proceeds.

With these and such other objects in view, the invention consists in the construction, arrangement, and combination of the various parts of the invention, whereby the objects contemplated are attained, as hereinafter set forth, pointed out in the appended claims, and illustrated in the accompanying drawings.

In these drawings:

FIGURE 3 is a section taken on line 3—3 in FIGURE 1; and

FIGURE 4 is a section taken on line 4—4 of FIGURE 3.

Figure 1:
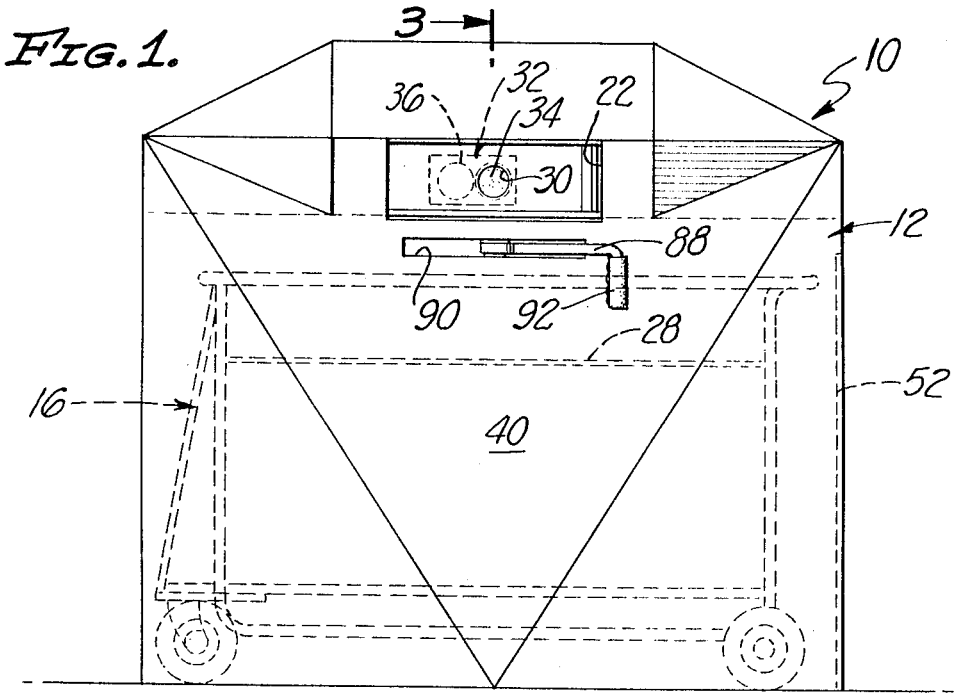
FIGURE 1 is a front elevational view of an article depository according to the invention which is intended primarily to function as an unattended library book collection or return facility.
Figure 2:
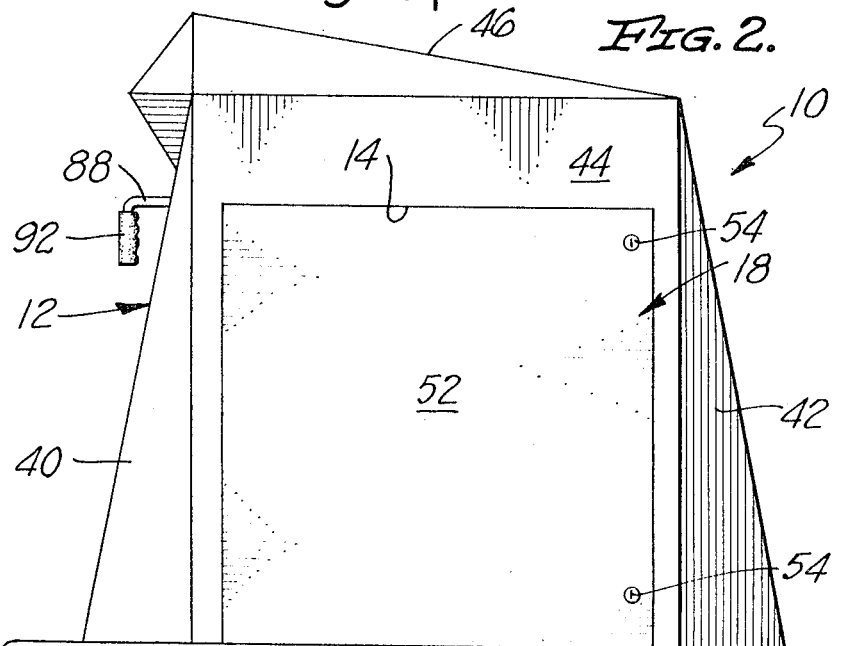
FIGURE 2 is an elevation view of the right-hand end of the depository in FIGURE 1.

In general terms, the invention provides an article depository, represented in the drawings by the depository 10, having a cabinet 12 with an access opening 14. Normally housed within the cabinet 12, and movable into and from the cabinet through its access opening 14, is an article receiver 16. While the depository may, conceivably, utilize various types of article receivers, the preferred receiver is a wheeled cart, as illustrated in the drawings. As noted earlier, the present depository is intended to retain the collected articles in a safe and secure unattended condition. To this end, the cabinet is equipped with locking means 18 for locking the cabinet against unauthorized access to the article receiver 16. In addition, the depository cabinet is provided with article in-feed means 20 for receiving articles from the depository users and depositing the articles in the article receiver 16 and with signaling means 21 for indicating to prospective users when the depository is filled to capacity. The article in-feed means 20 include an article receiving opening 22 in the front side of the cabinet 12 through which articles may be inserted into the cabinet by depository users, and conveyor means 24, operable by each user, for transporting the articles inserted through the receiving opening from the latter to an article discharge opening 26 overlying the article receiver 16, through which the articles drop from the conveyor means into the receiver.

Owing to the fact that in the illustrated article depository 10, the articles drop from the conveyor means 24 into the article receiver 16, the latter is preferably equipped with a floating bottom wall 28 which is spring loaded upwardly by a linear spring mechanism, or the like. When the receiver is empty, this wall assumes a normal position adjacent the top of the receiver. As the receiver is filled with collected articles, the weight of the articles gradually depresses the wall downwardly against the spring loading of the linear spring mechanism, so that the uppermost articles in the receiver will always be located adjacent the top of the receiver. In this way, the free fall distance of the articles dropping from the conveyor means 24 into the receiver is minimized and damage to the articles is prevented.

The illustrated signaling means 21 comprise a signal opening 30 in the front side of the depository cabinet 12, adjacent to the receiving opening 22, through which is exposed a signal flag 32. The signal flag is provided with suitable indicia, such as portons or fields 34, 36 of different color for indicating, respectively, that the depository is in a conditon to receive additional articles and that the depository is filled to capacity. The flag is mounted in the cabinet for movement between positions wherein one or the other of its fields is exposed through the signal opening. For convenience in the ensuing description, the position occupied by the flag when the latter indicates that the depository is in condition to receive additional articles is referred to as its empty position. The position occupied by the flag when indicating that the depository is filled to capacity is referred to as its full position. Associated with the flag are operating means 39 which normaly retain the flag in its empty position and cause movement of the flag to its full position in response to filling of the depository to capacity.

Briefly, in use of the depository, the latter is situated in a convenient location to receive articles from the depository users. When inserting articles into the depository, the user will operate the conveyor means 24 to article receiving position and then insert the articles through the receiving opening 22 in the depository cabinet 12. The user will then operate the conveyor means to its article discharge position, wherein the articles drop from the conveyor means, through the discharge opening 26, into the underlying article receiver 16. Periodically, the article receiver will be removed from the cabinet by an authorized person and transported to an appropriate article handling facility, where the articles will be removed from the receiver. Thereafter, the receiver will be returned to the cabinet.

Referring now in greater detail to the library book depository or return facility which has been selected for illustration in the drawings, the depository cabinet 12 will be seen to comprise a generally rectangular sheet metal housing having front and rear walls 40, 42, end walls 44, and a top wall 46. Extending across the interior of the cabinet, just below the level of the article receiving opening 22 in the front cabinet wall 40, is a horizontal partition 48. The interior cabinet region below this partition defines a lower compartment 50 in the cabinet for receiving the article receiver or cart 16. The access opening 14 through which the cart is movable into and from the cabinet opens through one end wall 44 of the cabinet into the lower compartment 50. The locking means 18 of the illustrated depository comprises a door 52 for closing the access opening. This door is equipped with a suitable lock 54 which may be opened only by authorized persons. When the depository is installed at its intended location, the depository cabinet 12 will be suitably bolted or otherwise firmly anchored in place to prevent access to the cabinet interior by simply raising the cabinet. Alternatively, the cabinet may be provided with a bottom wall.

As shown best in FIGURES 3 and 4, the article receiving opening 22 in the cabinet 12 is bounded by inwardly directed flanges 56 on the front cabinet wall 40. Extending from these flanges toward the end walls 44, respectively, of the cabinet are cylindrically curved walls 58 which may be welded to the cabinet partition 48, as shown.

The conveyor means 24 of the illustrated book depository comprise a tray-like conveyor member 60 located directly above the cabinet partition 48. This conveyor member or tray has a bottom wall 62 which is rotatably supported on the partition 48 by means of a pivot shaft 64 fixed to the tray wall and rotatably supported in a bearing fixed to the partition. The axis of this bearing, and hence the rotation axis of the tray, coincides with the axis of curvature of the inner, cylindrically curved partition walls 58. The conveyor tray 60 is suported on the partition 48 for rotation between its full line and broken line positions of FIGURE 4. When the tray occupies its broken line position, herein referred to as its book receiving position or simply receiving position, the front opening 80 in the tray enclosure 72 registers with the front book receiving opening 22 in the cabinet 12 to permit a depository user to insert books through the receiving opening into the enclosure. In this regard, it will be understood that the receiving opening and enclosure are dimensioned to accommodate the largest books which are normally stocked by a library. Also, the receiving opening is preferably located at a level adjacent the top wall of the enclosure to permit a number of books to be inserted into the enclosure at one time. When the conveyor tray 60 occupies its full line position, herein referred to as its book discharge position or simply discharge position, the bottom opening 78 of the tray enclosure registers with the discharge opening 26 in the cabinet partition 48. In this discharge position of the tray, therefore, books contained within the tray enclosure will drop through the discharge opening into the underlying book receiving cart 16. It is significant to note here that when the tray is rotated from its receiving position to its discharge position, the trailing curved tray edge wall 68 rotates across the receiving opening to block the latter against insertion of books therethrough. Thus, books may be inserted into the depository only when the conveyor tray occupies its receiving position.

The conveyor tray 60 is rotated between its receiving and discharge positions by the operating means 38. The particular operating means illustrated comprise a driven sprocket 82 fixed in the lower end of the tray pivot shaft 64 and a driving sprocket 84 rotatably supported on the underside of the cabinet partition 48, adjacent front wall 40 of the cabinet 12. Trained about these sprockets is a sprocket chain 86. A crank handle 88 is fixed to the driving sprocket 84 for rotating the latter and, thereby, the driven sprocket 82 and the conveyor tray 60. Handle 88 extends forwardly through a slot 90 in the front cabinet wall 40 and terminates in a downturned grip portion 92 which is accessible to the depository users. The operating means 38 are so arranged that movement of the operating handle 88 to its broken line position in FIGURE 4 rotates the conveyor tray 60 to its broken line book receiving position. Movement of the handle to its full line position rotates the tray to its full line discharge position.

It will be recalled that the depository is equipped with signaling means 21 for indicating when the depository is filled to capacity and that these signaling means include a flag 32 having fields 34, 36, such as red and green colors, one of which is exposed through the signal opening 30 when the flag occupies its empty position and the other of which is exposed through the signal opening when the flag occupies its full position. Referring to FIGURE 1, it will be observed that the signal opening 30 is formed in the curved conveyor tray wall 68 so that the opening is exposed through the book receiving opening 22 when the conveyor tray occupies its discharge position. The signal flag 32 comprises an upstanding flange rigidly mounted on the front end of a signal arm 94. This arm is pivotally mounted at 96 on the bottom wall 62 of the conveyor tray 60 for rotation of the flag between its empty and full positions relative to the tray. As shown best in FIGURE 4, the signal arm flange which forms the flag 32 is disposed in close proximity to the tray wall 68 and is curved to substantially match the inner curvature of this wall. If desired, the signal arm may also have upstanding reinforcing flanges along its longitudinal or radial edges. The full line position of the signal arm 94 in FIGURE 4 is its empty position. The broken line position of the signal arm is its full position. It is evident at this point, therefore, that rotation of the signal arm to its full line position exposes the empty or green field 34 of the signal flag 32 to potential depository users, through the signal opening 30, thus to indicate that the depository is conditioned to receive additional books. As explained below, the signal arm is rotated to its full position, to expose the full or red field 36 of the flag through the signal opening, when the depository is filled to capacity.

To this latter end, the signal arm 94 is urged to its full position by a spring 98 connected between the arm and the conveyor tray 60. Extending from the rear end of the arm is a rod 100 mounting a laterally extending stop member 102. Pivotally mounted on the bottom wall 62 of the conveyor tray 60 is a lever 104, the pivot shaft of which mounts a laterally extending stop member 106 which is engageable with the signal arm stop member 102, to retain the signal arm 94 in its full line empty position of FIGURE 4, when the lever 104 occupies its position illustrated in the latter figure. Lever 104 is located below the cabinet partition 48, within the partition discharge opening 26. When an empty book receiving cart 16 is placed in the depository 10, the signal arm 94 is rotated to its empty position, after which the signal arm latching lever 104 is set in its position of FIGURE 4, to lock or latch the signal arm in its empty position. Eventually, when the book cart 16 is filled to capacity, the latching lever will engage an upper book in the cart during rotation of the conveyor tray 60 to its discharge position. This discharge will rotate the latching lever to release the signal arm, and thereby permit rotation of the signal arm to its full position under the force of the signal arm spring 98. Thereafter, the signal arm and latching lever are again reset when the full cart is removed and replaced by an empty cart.

The operation of the illustrated book depository 10 is now believed to be obvious. Thus, when a user desires to deposit a library book in the depository, he rotates the conveyor tray operating handle 88 to its broken line position of FIGURE 4, thus to rotate the conveyor tray 60 to its broken line, book receiving position. The book or books are then inserted through the front receiving opening 22 in the depository, into the conveyor tray enclosure 72. At this point, the conveyor tray operating handle 88 is rotated to its full line position of FIGURE 4, thus to rotate the conveyor tray to its discharge position, wherein the books drop from the tray enclosure, through the discharge opening 26 in the depository partition 48, into the underlying cart 16. Each time the tray is rotated to its discharge position, the signal opening 30 is exposed through the book receiving opening 22 to indicate whether the depository is empty or full. When the depository is filled to capacity, the signal arm latching lever will engage a top book in the cart and will thereby be rotated to release the signal arm 94 for rotation of the latter to its empty position under the action of the signal arm spring 98.

Periodically, the book cart 16 is removed from the depository cabinet 12 and replaced by an empty cart. As noted earlier, a significant feature of the invention resides in the fact that a filled book cart may be transported from the depository to an appropriate book handling facility without further handling of the books at the depository. This, of course, results in a substantial saving of time and effort in handling the library books. According to a preferred feature of the invention, mentioned earlier, the book cart 16 is provided with a floating bottom wall 28 which is spring loaded upwardly, by a linear spring mechanism or the like (not shown). When the cart is empty, this spring mechanism will retain the cart wall 28 in a position adjacent the open top of the cart. As the cart is filled with books, the weight of the books will gradually depress the wall 28 downwardly to accommodate additional books in such a way that the top books in the cart will always be located at the approximate level of the open top of the cart. This minimizes the free fall distance of the books dropping from the conveyor tray enclosure 72. The possibility of damage to the books is thereby minimized or eliminated.

Those versed in the art will appreciate that the present invention achieves the objects and realizes the advantages hereinbefore mentioned.

Although specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art.

What is claimed is:

1. A depistory for articles such as library books, comprising:
   a cabinet having an access opening,
   an article receiver movable into and from said cabinet through said access opening, and
   said cabinet including means for locking said cabinet against unauthorized access to said receiver, and
   article in-feed means accessible to individual depository users for receiving articles from said users and depositing said articles in said receiver in such manner that the collected articles are removable from the depository only by authorized removal of said article receiver.

2. A depository according to claim 1 where:
   said depository is adapted for use as an unattended library book return facility,
   said receiver comprises a wheeled cart for transporting books placed in said depository from the latter to a book handling facility, and
   said access opening is located in one side of said cabinet to permit wheeling of said cart into and from said cabinet.

3. An article depository according to claim 2 wherein:
   said receiver comprises an open top receptacle into which the articles placed in the depository drop from said in-feed means, and a floating bottom wall in said receptacle which is gradually depressed by the weight of said articles as said receptacle is filled, thereby to minimize the free fall distance of articles from said in-feed means to said receptacle.

4. A depository according to claim 1 including:
   signaling means for indicating to prospective depository users when said receiver is filled to capacity.

5. An article depository according to claim 1 wherein:
   said in-feed means comprises an article receiving opening in said cabinet accessible to said depository users, and article conveyor means operable by each user for receiving articles inserted through said receiving opening and transporting the received articles to said article receiver.

6. A depository according to claim 5 wherein:
   said conveyor means comprises a conveyor member within said cabinet over said article receiver, means supporting said conveyor member on said cabinet for movement between an article receiving position wherein said conveyor member is disposed to receive articles through said receiving opening, and an article discharge position remote from said receiving position, operating means accessible externally of said cabinet for moving said conveyor member between said positions, and means for discharging articles from said conveyor member to said article receiver in response to movement of said conveyor member to said discharge position.

7. A depository according to claim 6 including:
   means for blocking said receiving opening upon movement of said conveyor member from said receiving position to said discharge position.

8. A depository according to claim 7 wherein:
   said blocking means comprise a gate carrier by said conveyor member for movement across said receiving opening on movement of said member from said receiving position.

9. A depository according to claim 1 wherein:
   said cabinet has a lower compartment for receiving said article receiver, and
   said in-feed means comprises an article receiving opening in said cabinet accessible to said depository users, a normally generally horizontal partition within said cabinet between said compartment and receiving opening, said partition having an article discharge opening spaced from said receiving opening and disposed to overlie said article receiver when the latter is positioned in such compartment, a conveyor member mounted over said partition for movement between an article receiving position adjacent said receiving opening, wherein said member is disposed to receive articles through said receiving opening, and an article discharge position adjacent said discharge opening, wherein said member is disposed to discharge articles through said discharge opening in the underlying article receiver, and operating means accessible externally of said cabinet for moving said conveyor member between said receiving and discharge positions.

10. A depository according to claim 9 wherein:

said conveyor member includes an enclosure having a front opening which registers with said receiving opening when said conveyor member occupies its receiving position and a bottom opening which registers with said discharge opening when said conveyor member occupies its discharge position.

11. A depository according to claim 10 wherein:

said conveyor member further comprises a gate which is located at the trailing side of said enclosure relative to the direction of movement of said conveyor member from said receiving position to said discharge position and moves across said receiving opening to block the latter opening upon movement of said conveyor member from said receiving position.

12. A depository according to claim 1 wherein:

said in-feed means comprises an article receiving opening in said cabinet accessible to said depository users, and article conveyor means operable by each user for receiving articles inserted through said receiving opening and transporting the received articles to said article receiver, and signaling means for indicating when said article receiver is filled to capacity including a signal flag within and having two distinct fields exposable through a signal opening in said cabinet, means mounting said flag for movement between an empty position, wherein one of said fields is exposed through said signal opening to indicate that the depository is conditioned to receive additional books, and a full position, wherein the other field is exposed through said signal opening to indicate that the depository is filled to capacity, means for normally retaining said signal flag in said empty position, and means for effecting movement of said flag to its full position in response to filling of said article receiver to capacity.

13. A depository according to claim 12 wherein:

said signaling means further comprise a signal arm carrying said flag and movably mounted on said conveyor member for movement with the latter member between said receiving and discharging positions, means for urging said signal arm to its full position, a latching lever movably mounted on said conveyor member for releasably retaining said signal arm in its empty position, and said latching lever being disposed for engagement by upper articles in said article receiver when the latter is filled to capacity in such a way that said latching lever is moved by said upper articles to release said signal arm for movement to its full position.

14. A depository according to claim 13 wherein:

said depository is adapted to receive library books, said cabinet includes an inner generally horizontal partition having a discharge opening overlying said receiver.

said receiver comprises a wheeled cart adapted to be wheeled into and from said cabinet, said conveyor member comprises a conveyor tray disposed over and rotatably mounted on said partition for rotation between said receiving and discharge positions, said tray including an enclosure having a front opening which registers with said receiving opening to receive books through said receiving opening when said tray occupies said receiving position, and a bottom opening which registers with said discharge opening when said tray occupies said discharge position, whereby books dropped from said enclosure into said cart, and said signal arm and latching lever are pivotally mounted on said tray.

References Cited

UNITED STATES PATENTS

| | | | |
|---|---|---|---|
| 2,465,431 | 3/1949 | Cisenfeld | 232—4 |
| 3,021,050 | 2/1962 | Rogers | 232—43.1 |
| 3,292,849 | 12/1966 | Ewing | 232—43.2 |

CASMIR A. NUNBERG, Primary Examiner

U.S. Cl. X.R.

232—1